UNITED STATES PATENT OFFICE.

JONAS J. SELDNER, OF BALTIMORE, MARYLAND.

PROCESS OF MAKING FERTILIZERS.

SPECIFICATION forming part of Letters Patent No. 514,043, dated February 6, 1894.

Application filed July 20, 1893. Serial No. 481,051. (No specimens.)

*To all whom it may concern:*

Be it known that I, JONAS J. SELDNER, a citizen of the United States, residing at Baltimore, in the State of Maryland, have invented certain new and useful Improvements in the Manufacture of Fertilizers, of which the following is a specification.

My invention relates to the manufacture of fertilizers from refuse hair, fur, feathers, leather scrap and other similar material containing a high percentage of nitrogenous substances.

The object of my invention is to produce a complete marketable fertilizer which is rich in ammonia and phosphates at a single operation and therefore very cheaply, the expense for labor being reduced to a minimum.

I have heretofore found that the above substances can be rapidly and cheaply reduced to a finely comminuted or dissolved state by subjecting them in combination with sulphuric acid to heat in a closed vessel. Previous to the present invention I have first reduced the hair and other material with acid as above described and afterward mixed with it dissolved bone or other phosphate and any other ingredients necessary to make up the desired fertilizer. The cost of the sulphuric acid and the cost of adding and mixing ingredients at different times I now save.

In accordance with my present invention, instead of using sulphuric or other acid in the liquid form, I mix the hair or other nitrogenous material with dissolved bone or other acid phosphate and add a little water if necessary. I find that the dissolved bone or acid phosphate contains sufficient free acid to effect the reduction of the nitrogenous material. Before subjecting the mixture to heat, any additional elements which it is desired to put into the fertilizer may be added, such for instance as an acid salt of potash, soda or magnesia.

The proportions of hair, &c., and acid phosphate or dissolved bone will depend entirely upon the resultant fertilizer desired; or, in other words, upon the percentage of ammonia required in the fertilizer. I have found that three parts of acid phosphate added to two parts of hair yield about 4.8 per cent. of ammonia; also that three parts of acid phosphate combined with one part of hair will produce about three per cent. of ammonia. This latter proportion is the usual one in commercial fertilizers. When used in the above proportions or in any proportions required for fertilizers there is always sufficient free acid in the acid phosphate to reduce the hair, &c. After the hair or its equivalent has been mixed with the acid phosphate and with any other substances which it is desired to incorporate with the fertilizer, such as an acid salt of potash or soda, the mixture is placed in a steam tight vessel and subjected to heat until the fiber of the animal matter is entirely destroyed. The operation is preferably performed in a vessel which is provided with a steam jacket, by which means heat may be applied without the danger of scorching the contents. It is also preferable that the vessel be provided with a stirring device, or be fitted to rotate upon an axis, in order that the contents may be thoroughly mixed while the heating operation is taking place.

By the above process I am enabled to make a high grade fertilizer at a very small cost apart from the first cost of the raw materials. Furthermore, the apparatus required is simple and comparatively inexpensive, and the time required to complete the operation is very short, owing to the rapid action of the acid upon the animal matter.

In the above specification I have referred to sulphuric acid only. So far as my invention is concerned, other acids, such as nitric and hydrochloric are the equivalents of sulphuric, but as the latter is the cheapest and the only one likely to be used, I have not referred to the others in the description.

What I claim, and desire to secure by Letters Patent, is—

1. In the manufacture of fertilizers the improvement which consists in first mixing together hair or equivalent material and an acid phosphate, and then subjecting the mixture to heat in a closed vessel, until the hair or equivalent material becomes disintegrated and dissolved, substantially as described.

2. In the manufacture of fertilizers the improvement which consists in first mixing together hair or equivalent material, an acid phosphate of lime, and any other desired ingredients such as an acid salt of potash or soda, and then placing the mixture in a closed vessel and subjecting it to heat until the hair or equivalent material becomes disintegrated and dissolved, substantially as described.

In testimony whereof I affix my signature in presence of two witnesses.

JONAS J. SELDNER.

Witnesses:
FREDERICK W. STORY,
JNO. WATSON, Jr.